(12) United States Patent
Ballard

(10) Patent No.: US 7,206,156 B2
(45) Date of Patent: *Apr. 17, 2007

(54) TAPE DRIVE ERROR MANAGEMENT

(75) Inventor: Curtis C. Ballard, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/191,115

(22) Filed: Jul. 27, 2005

(65) Prior Publication Data

US 2007/0025008 A1    Feb. 1, 2007

(51) Int. Cl.
G11B 15/18 (2006.01)

(52) U.S. Cl. ........................................ 360/69
(58) Field of Classification Search ............... None
See application file for complete search history.

(56) References Cited

U.S. PATENT DOCUMENTS

| | | | |
|---|---|---|---|
| 5,923,876 A | 7/1999 | Teague | |
| 6,088,182 A * | 7/2000 | Taki et al. ............... | 360/71 |
| 6,161,192 A | 12/2000 | Lubbers | |
| 6,170,063 B1 | 1/2001 | Golding | |
| 6,295,578 B1 | 9/2001 | Dimitroff | |
| 6,397,293 B2 | 5/2002 | Shrader | |
| 6,487,636 B1 | 11/2002 | Dolphin | |
| 6,490,122 B1 | 12/2002 | Holmquist et al. | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliott | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B2 | 6/2004 | Reuter | |
| 6,763,409 B1 | 7/2004 | Elliott | |

(Continued)

OTHER PUBLICATIONS

U.S. Appl. No. 11/047,171, Ballard.

*Primary Examiner*—K. Wong

(57) ABSTRACT

In one embodiment, a method of recording an error in a tape drive, comprises receiving, in a tape library controller, an internal identifier associated with a tape cartridge; recording, in a memory medium associated with the tape library controller, the internal identifier; associating, in the memory medium, the internal identifier with an external identifier associated with the tape cartridge; and providing information in the memory medium to identify the tape cartridge in a subsequent error analysis routine.

22 Claims, 5 Drawing Sheets

U.S. PATENT DOCUMENTS

| | | |
|---|---|---|
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,829,117 B2 * | 12/2004 | Taki et al. ............. 360/69 |
| 6,839,824 B2 | 1/2005 | Camble |
| 6,842,833 B1 | 1/2005 | Phillips |
| 6,845,403 B2 | 1/2005 | Chadalapaka |
| 6,970,318 B2 * | 11/2005 | Goodman et al. ......... 360/69 |
| 7,038,874 B1 * | 5/2006 | Jaquette et al. ......... 360/69 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0022546 A1 | 2/2004 | Cochran |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0168034 A1 | 8/2004 | Sigeo |
| 2004/0215602 A1 | 10/2004 | Cioccarelli |
| 2004/0230859 A1 | 11/2004 | Cochran |
| 2004/0128404 A1 | 12/2004 | Cochran |
| 2004/0267959 A1 | 12/2004 | Cochran |

* cited by examiner

TAPE DRIVE ERROR MANAGEMENT

BACKGROUND

The described subject matter relates to electronic computing, and more particularly to error management in tape libraries.

Tape libraries may be used as one component of a data storage architecture. A conventional tape library comprises a plurality of tape drives, the operations of which are controlled by one or more tape drive controllers, and a separate controller that controls the operations of the library.

Periodically, errors occur in tape drives. Some tape drives maintain a log of drive events that occur to facilitate analysis and correction of technical problems with the drive. The event log records information about the nature of errors and operations of the drive, and may also include information about the operating hardware and software.

SUMMARY

In one embodiment, a method of recording an error in a tape drive, comprises receiving, in a tape library controller, an internal identifier associated with a tape cartridge; recording, in a memory medium associated with the tape library controller, the internal identifier; associating, in the memory medium, the internal identifier with an external identifier associated with the tape cartridge; and providing information in the memory medium to identify the tape cartridge in a subsequent error analysis routine.

DETAILED DESCRIPTION

Described herein are exemplary tape library architectures, and methods for recording an error in a tape drive. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

In exemplary embodiments, the architectures and methods may be implemented in tape storage libraries such as the tape storage libraries described in U.S. Pat. Nos. 5,926,341; 6,028,733; or 6,421,306, commonly assigned to the assignee of the present application, the disclosures of which are incorporated by reference herein in their entirety.

Figure 1:
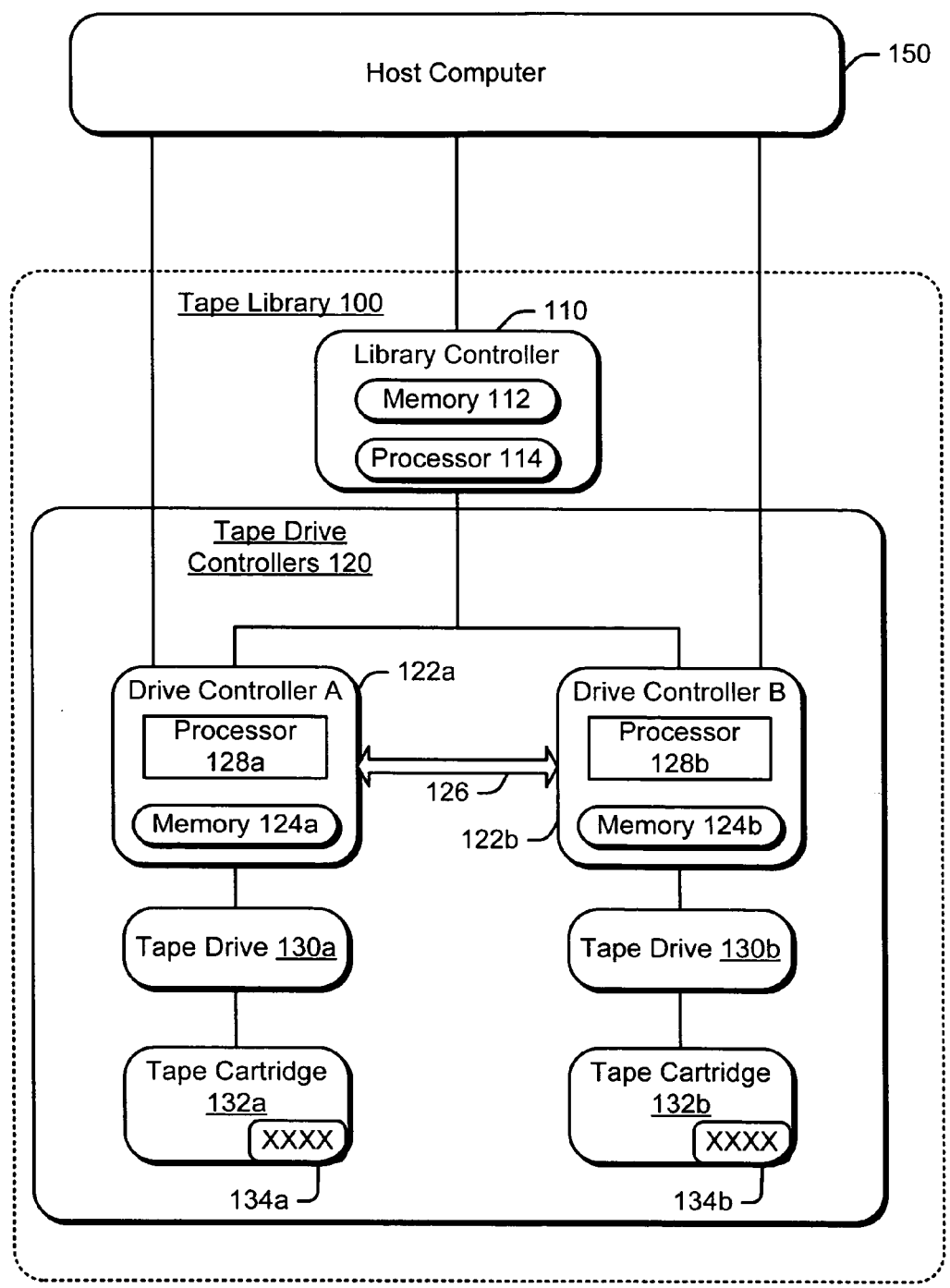
FIG. 1 is a schematic illustration of an exemplary embodiment of a tape library.

FIG. 1 is a schematic illustration of an exemplary embodiment of a tape library 100. The tape library 100 includes a library controller module 110, including a processor 114 which is coupled to a memory medium 112, and one or more tape drive controllers 120, which are coupled to (or contained within) a plurality of tape drives 130a–130b via one or more interface buses, such as a small computer system interface (SCSI) bus. The library controller 110 is coupled to the tape drive controllers 120 via one or more interface buses such as, e.g., an RS422 bus or an inter-integrated circuit (I2C) bus. It is noted that the library controller 110 can be embodied as a separate component (as shown), or can be co-located with one or more of the driver controllers 120, or within a separate host computer 150. The library controller 110 may be implemented as a software module that runs on a general purpose processing unit of the tape library, or as a special-purpose chipset. In some embodiments the host computer 150 may be connected to the drive controllers and the library controller by another bus. By way of example, the host computer 150 may be connected to the library and drives using SCSI and the library may be connected to the drives using RS422.

The tape drive controllers 120 coordinate data transfer to and from the one or more tape drives 130a–130b. In one embodiment, the library includes two tape drive controllers: a first tape drive controller 122a and a second tape drive controller 122b. The controllers may operate independently or may be configured to operate in parallel to enhance reliability by providing continuous backup and redundancy in the event that one controller becomes inoperable. Tape drive controllers 122a and 122b have respective processors 128a and 128b and respective memories 124a and 124b. Processors 128a, 128b may be implemented as general purpose processors that may be configured to execute logic instructions in the respective memories 124a, 124b, or as special purpose processors adapted to implement logic instructions embodied as firmware, or as ASICs. The memories 124a and 124b may be implemented as battery-backed, non-volatile RAMs (NVRAMs). Although only two controllers 122a and 122b are shown and discussed generally herein, aspects of this invention can be extended to other multi-controller configurations where more than two controllers are employed.

The controller's memories 122a and 122b may be physically coupled via a communication interface 126 such as, e.g., a PCI bus or another suitable communication bus. Controllers 122a and 122b may monitor data transfers between them to ensure that data is accurately transferred and that transaction ordering is preserved (e.g., read/write ordering).

In one embodiment, the tape drives 130a, 130b are configured to receive a tape cartridge 132a, 132b, respectively. Input/Output (I/O) operations requested by host computer 150 may be executed against the respective tape cartridges 132a, 132b. The tape cartridges 132a, 132b may include respective unique external identifiers 134a, 134b, which may be implemented as a bar code or other external identifying indicia associated with the respective tape cartridge 132a, 132b. The external identifiers 134a, 134b need not be readable by human operators. For example, a radio frequency identification (RFID) tag may be used as an identifier. In addition, optical identifiers such as holograms, diffraction patterns, and the like may be used as external identifiers 134a, 134b.

Figure 2:
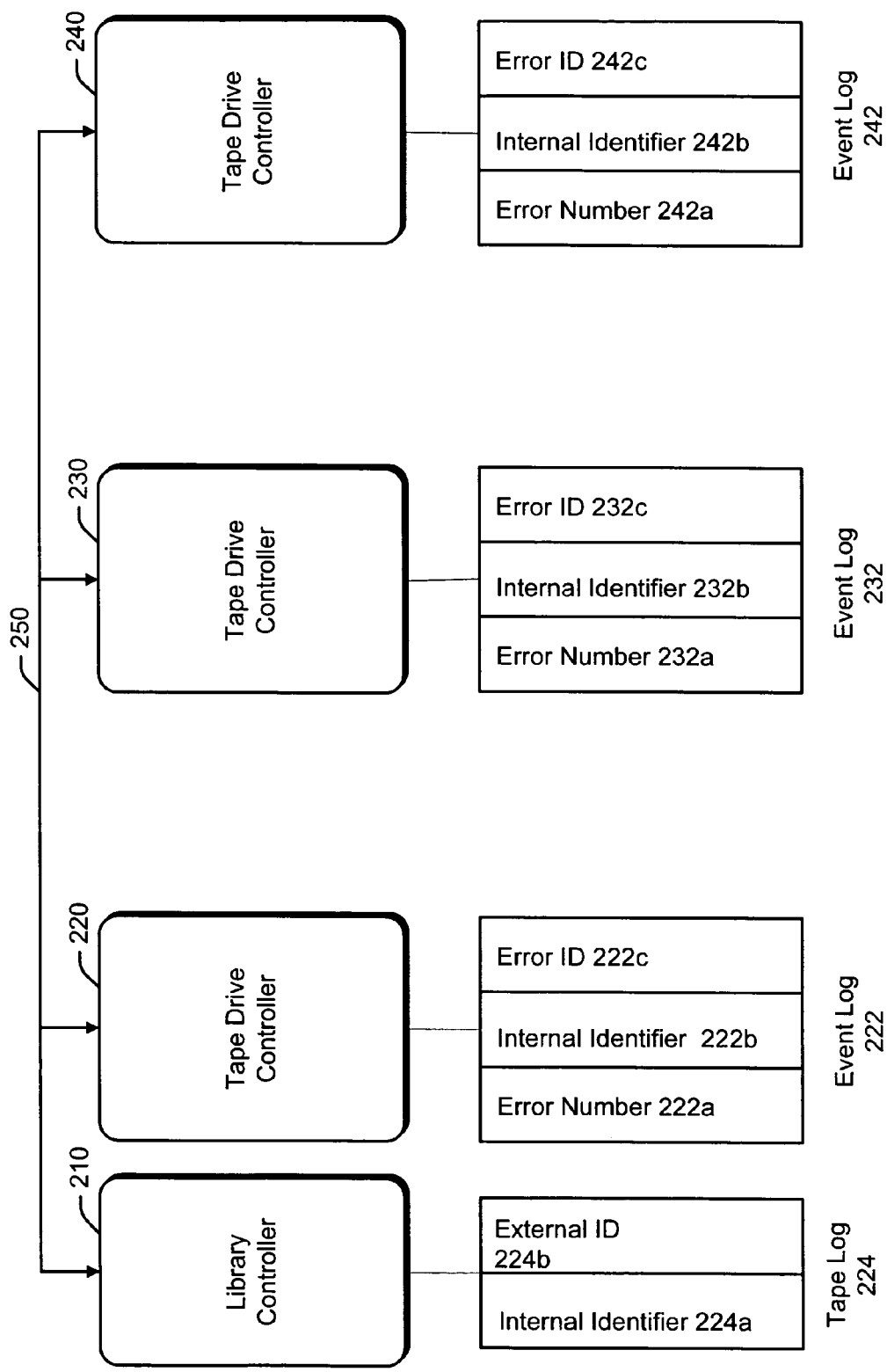
FIG. 2 is a schematic illustration of an exemplary embodiment of a tape library.

FIG. 2 is a schematic illustration of an exemplary embodiment of a tape library. Referring to FIG. 2, the tape library includes a library controller 210 and a plurality of tape controllers 220, 230, 240 communicatively connected to the library controller 210 by a suitable communication bus 250.

The particular embodiment of the communication bus 250 is not critical. In one embodiment the communication bus may be implemented as a backplane and the respective tape controllers 220, 230, 240 may be implemented as cards that connect to the backplane. In alternate embodiments the communication bus may be implemented by a bus such as a PCI bus, or by a point-to-point connection such as an RS422 connection.

In one embodiment one or more of the tape controllers 220, 230, 240 maintain one or more event logs. Among other things, errors that occur in the tape drive are recorded in the tape drive's event log. In the embodiment illustrated in FIG. 2 each tape controller 220, 230, 240 maintains a separate event log 222, 232, 242, respectively, in a memory location associated with the controller. In addition, the library controller 210 maintains a separate tape log 224. In alternate embodiments the separate controllers may maintain a single event log in a memory location shared between the controllers.

The respective event logs 222, 232, 242 may include information identifying, among other things, hardware and software packages operating on the respective tape drive controllers 220, 230, 240, the version number(s) of firmware executing on the controller, and other information associated with the controller. The event logs 222, 232, 242 may also log information regarding an error, including an error number 222a, 232a, 242a assigned to the error, a internal identifier such as, e.g., a tape serial number 222b, 232b, 242b and an error identifier 222c, 232c, 242c associated with the error. The tape serial number is not necessarily associated with a human-readable identifier on the tape cartridge.

In one embodiment, tape log 224 may be stored in a suitable memory location such as, e.g., a non-volatile memory module, associated with the library controller 210. Tape log 224 may include fields for storing information identifying, among other things, the respective internal identifiers 224a and external identifiers 224b associated with each tape inserted into the drive. Optionally the tape log 224 may also include an identifier associated with one or more drives in which the tape was previously inserted. In an alternate embodiment, the respective event logs 222, 232, 242 may include a field for recording the external identifier 134a, 134b of a tape cartridge 132a, 132b that resides in a tape drive 130a, 130b.

Figure 3:
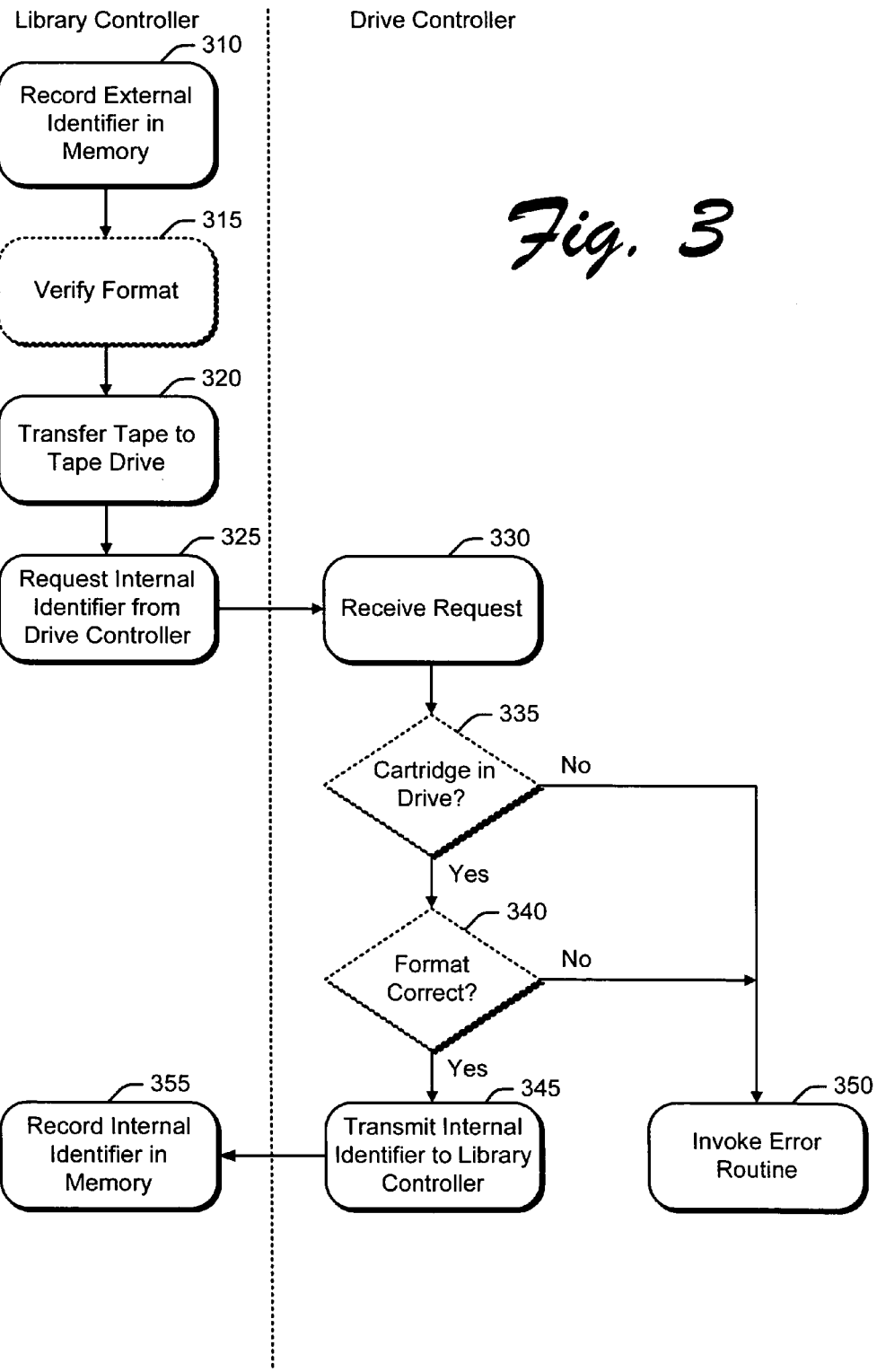
FIG. 3 is a flowchart illustrating operations in an exemplary embodiment of a method for recording an external identifier associated with a tape.

Operations for recording errors in tape drives will be explained with reference to FIGS. 3–4. FIG. 3 is a flowchart illustrating operations in one embodiment of a method for recording an external identifier associated with a tape. Referring to FIG. 3, at operation 310 a library controller such as library controller 210 records in memory an external identifier associated with a tape cartridge. In one embodiment the external identifier may be implemented as a bar code or other external identifying indicia associated with the tape cartridge. The library controller may read the barcode using a conventional optical scanner and associated software, for example, when the library controller is picking the cartridge for delivery to a tape drive controller.

At operation 315 the library controller may verify the format of the external identifier. In one embodiment the format of the external identifier is encoded into a multi-character symbol, which may be verified by comparing the external identifier against one or more templates for external identifiers. If the format is incorrect, then an error routine may be invoked.

At operation 320 the library controller transfers the tape to a tape drive, such as one of the tape drives 130A, 130B, depicted in FIG. 1. When the tape cartridge is loaded into the tape drive, the tape drive controller may read the internal identifier associated with the tape cartridge from the medium on which the internal identifier is stored. At operation 325 the library controller issues a request to the tape drive controller for the internal identifier associated with the tape.

At operation 330 the tape drive controller receives the request from the library controller. Optionally, at operation 335, the tape drive controller determines whether there is a tape cartridge in the drive, and if not an error routine may be invoked, at operation 350. In one embodiment the error routine may include transmitting a reply to the library controller, wherein the reply indicates that a tape cartridge is not properly installed in the drive. In response to the reply, the library controller may initiate a routine to locate the tape cartridge and insert the cartridge into the drive. Alternatively, or in addition, the error routine may involve generating an alert to notify a user or administrator of the system of a malfunction.

By contrast, if there is a tape cartridge in the drive at operation 335, then control passes to operation 340, in which the drive controller determines whether the format of the internal identifier is correct. In one embodiment the format of the internal identifier is encoded into a multi-character symbol, which may be verified by comparing the internal identifier against one or more templates for identifiers. If the format is incorrect, then an error routine may be invoked at operation 350. In one embodiment the error routine may include logging an error in a memory associated with the drive controller and/or transmitting a reply to the library controller, wherein the reply indicates that a received internal identifier is incorrectly formatted. In response to the reply, the library controller may record the error in a memory medium. Alternatively, or in addition, the error routine may involve generating an alert to notify a user or administrator of the system of the error.

By contrast, if at operation 340 the internal identifier is formatted correctly, then the drive controller transmits the internal identifier to the library controller (operation 345). In one embodiment, the drive controller transmits the internal identifier to the library controller using a read_attribute command using the Automation/Drive Interface (ADI) protocol. The internal identifier is recorded in a suitable memory medium (operation 355) associated with the library controller. In one embodiment, the internal identifier may be recorded in the tape log 224 in association with the external identifier associated with the tape cartridge.

Figure 4:
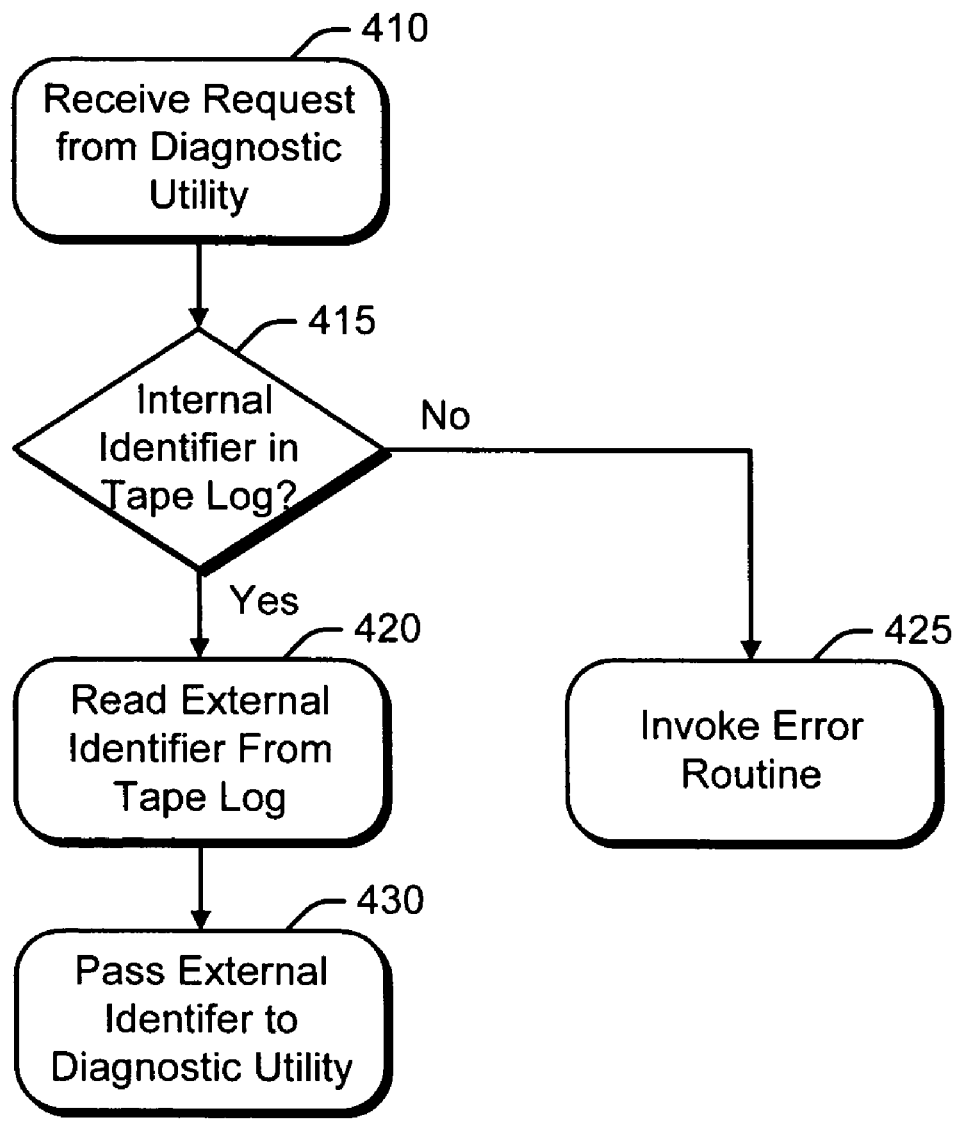
FIG. 4 is a flowchart illustrating operations in an exemplary embodiment of a method for reporting a previously logged external identifier associated with a tape.

FIG. 4 is a flowchart illustrating operations in an exemplary embodiment of a method for managing errors in a tape library. At operation 410 the library controller receives a request from a diagnostic utility for managing errors in a tape library. In one embodiment the request includes an internal identifier associated with a tape cartridge. The request may be generated by an administrator or other user of the diagnostic utility. In alternate embodiments the diagnostic utility may generate the request. The diagnostic utility may be embodied as any suitable diagnostic utility for evaluating errors in a tape library. Particulars operational aspects of the diagnostic utility are beyond the scope of this disclosure. In one embodiment, the diagnostic utility may issue a SCSI Log Sense request to the library controller.

At operation 415 the library controller determines whether the internal identifier associated with the request received from the diagnostic utility is recorded in the tape log 224. If not, then an error routine may be invoked at operation 425. The error routine may involve communicating with the diagnostic utility and/or generating notices or warnings for users of the system.

If, at operation 415, the internal identifier is recorded in tape log 224, then control passes to operation 420, and the library controller reads the external identifier from tape log. At operation 430 the library controller passes the external identifier to the diagnostic utility.

Figure 5:
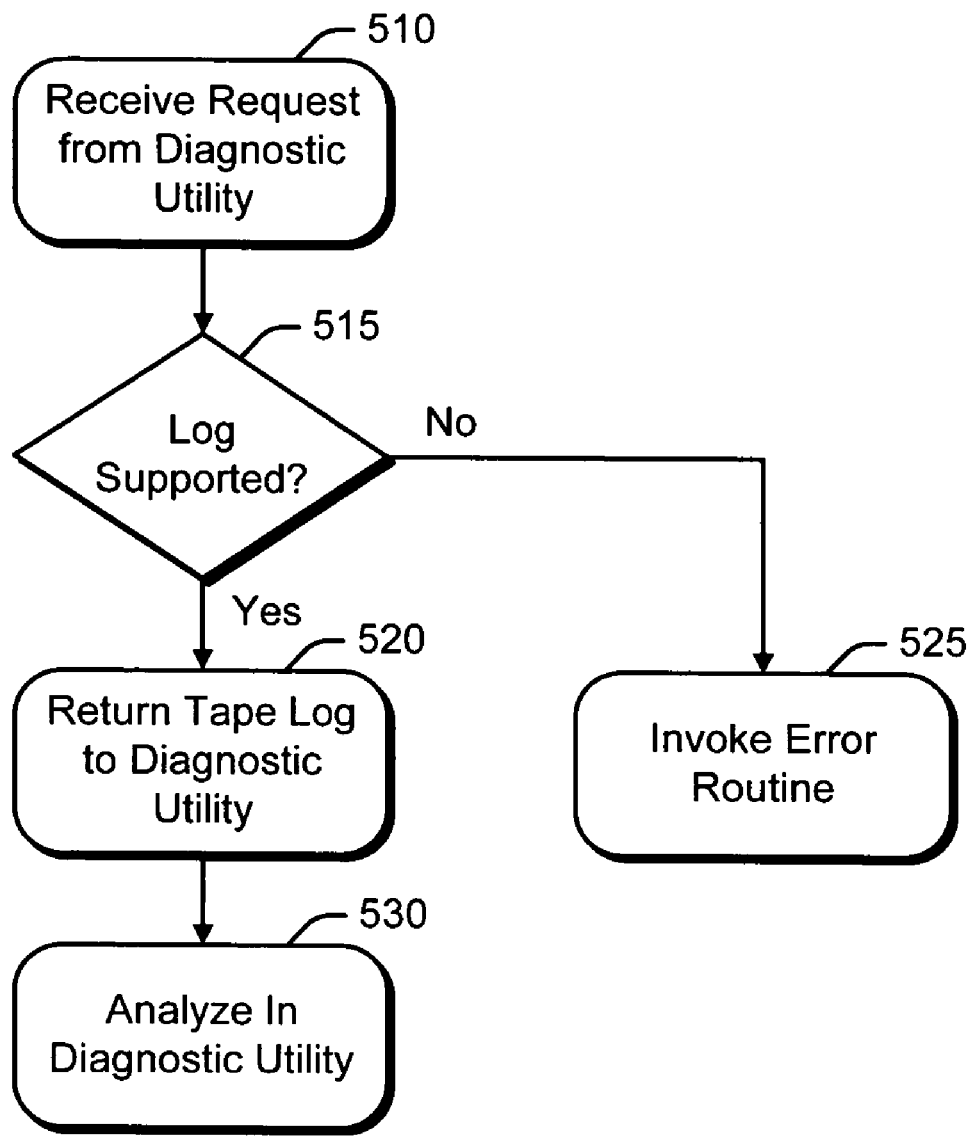
FIG. 5 is a flowchart illustrating operations in an exemplary embodiment of a method for reporting a tape identifier log.

FIG. 5 is a flowchart illustrating operations in an exemplary embodiment of a method for managing errors in a tape library. At operation 510 the library controller receives a request from a diagnostic utility for managing errors in a tape library. The request may be generated by an administrator or other user of the diagnostic utility. In alternate embodiments the diagnostic utility may generate the request. The diagnostic utility may be embodied as any suitable diagnostic utility for evaluating errors in a tape library. Particulars operational aspects of the diagnostic utility are beyond the scope of this disclosure. In one embodiment, the diagnostic utility may issue a SCSI Log Sense request to the library controller.

At operation 515 the library controller determines whether the library controller is adapted to support a tape log function. If not, then an error routine may be invoked at operation 525. The error routine may involve communicating with the diagnostic utility and/or generating notices or warnings for users of the system.

If, at operation 515, the library controller determines that the tape log function is supported, then control passes to operation 520, and the library controller returns at least a portion of the tape log to the diagnostic utility. In one embodiment the library controller may transmit the entire tape log to the diagnostic utility. In an alternate embodiment, the diagnostic utility may request only a portion of the tape log, and the library controller may transmit the requested portion. At operation 530 the diagnostic utility analyzes the tape log.

The operations of FIGS. 3–5 permit a tape library controller to manage a tape log that records an external identifier associated with tapes in the tape library. The external identifier may be provided to a diagnostic utility for error management purposes. Further, specialized firmware is not required on the tape drives. Not all operations depicted in FIGS. 3–5 are required. For example, the operations 335 and 340 may be omitted.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of recording an error in a tape drive, comprising:

transferring a tape cartridge to a tape drive having a tape drive controller after reading an external identifier on the tape cartridge with a tape library controller;

reading, with the tape drive controller, an internal identifier of the tape cartridge;

receiving, in the tape library controller, the internal identifier associated with the tape cartridge;

recording, in a memory medium associated with the tape library controller, the internal identifier; and associating, in the memory medium, the internal identifier with the external identifier associated with the tape cartridge.

2. The method of claim 1, wherein receiving, in the tape library controller, the internal identifier associated with the tape cartridge comprises:

issuing a request for the internal identifier from the tape library controller to the tape drive controller; and receiving a response to the request.

3. The method of claim 1, wherein recording, in a memory medium associated with the tape drive controller, the internal identifier, comprises recording the internal identifier in non-volatile memory medium.

4. The method of claim 1, wherein associating, in the memory medium, the internal identifier with the external identifier associated with the tape cartridge comprises recording the internal identifier in the memory medium.

5. The method of claim 1, further comprising providing information in the memory medium to identify the tape cartridge in a subsequent error analysis routine by:

receiving, in the tape library controller, a service request from a diagnostic application executing on a host computer; and transmitting information from the memory medium to the host computer in response to the request.

6. The method of claim 1, further comprising providing information in the memory medium to identify the tape cartridge in a subsequent error analysis routine by:

receiving, in the tape drive controller, a service request from a diagnostic application executing on a host computer; and transmitting information from an event log maintained by the tape drive controller to the host computer in response to the request.

7. The method of claim 1, wherein:

the external identifier comprises a bar code; and the tape library controller verifies a format of the bar code.

8. The method of claim 1, further comprising comparing the internal identifier against one or more templates to verify a format of the internal identifier.

9. A tape library, comprising:

a housing for receiving at least one tape cartridge;

a library controller comprising a first processor module and a first memory medium communicatively connected to the first processor module;

a tape drive controller comprising a second processor module and a second memory medium communicatively connected to the second processor module, wherein the library controller executes logic instructions that cause the first processor module to:

record an external identifier associated with a tape cartridge in the first memory medium;

transfer the tape cartridge to a tape drive so the tape drive controller can read an internal identifier associated with the tape cartridge;

request the internal identifier from the tape drive controller; and record the internal identifier in association with the external identifier in the first memory medium.

10. The tape library of claim 9, wherein the second processor in the tape drive controller records indicia of the internal identifier in the second memory medium.

11. The tape library of claim 9, wherein:
the external identifier comprises a bar code; and
the internal identifier comprises a serial number not associated with the external identifier.

12. The tape library of claim 9 wherein the library controller receives a response to the request for the internal identifier after the tape drive receives the tape cartridge and the tape drive controller reads the internal identifier.

13. The tape library of claim 9, wherein the tape drive controller records the external identifier and the internal identifier in a non-volatile memory medium.

14. The tape library of claim 9, wherein the library controller receives a service request from a diagnostic application executing on a host computer, and transmits information from the first memory medium to the host computer in response to the request.

15. The tape library of claim 9, wherein the tape drive controller receives a service request from a diagnostic application executing on a host computer, and transmits information from an event log maintained by the tape drive controller to the host computer in response to the request.

16. A computer program product comprising logic instructions stored on a computer readable medium which, when executed by a processor, cause the processor to recording an error in a tape drive by performing operations, comprising:
transferring a tape cartridge to a tape drive having a tape drive controller after reading an external identifier on the tape cartridge with a tape library controller;
reading, with the tape drive controller, an internal identifier of the tape cartridge;
receiving, in the tape library controller, the internal identifier associated with the tape cartridge;
recording, in a memory medium associated with the tape library controller, the internal identifier; and
associating, in the memory medium, the internal identifier with the external identifier associated with the tape cartridge.

17. The computer program product of claim 16, further comprising logic instructions which, when executed by the processor, cause the processor to:
issue a request for the internal identifier from the tape library controller to the tape drive controller; and
receive a response to the request.

18. The computer program product of claim 16, further comprising logic instructions which, when executed by the processor, cause the processor to record the internal identifier in non-volatile memory medium.

19. The computer program product of claim 16, further comprising logic instructions which, when executed by the processor, cause the processor to record the internal identifier in the memory medium.

20. The computer program product of claim 16, further comprising logic instructions which, when executed by the processor, cause the processor to:
receive, in the tape library controller, a service request from a diagnostic application executing on a host computer; and
transmit information from the memory medium to the host computer in response to the request.

21. The computer program product of claim 16, further comprising logic instructions which, when executed by the processor, cause the processor to:
receive, in the tape drive controller, a service request from a diagnostic application executing on a host computer; and
transmit information from an event log maintained by the tape drive controller to the host computer in response to the request.

22. The computer program product of claim 16, further comprising logic instructions which, when executed by the processor, cause the processor to provide information in the memory medium to identify the tape cartridge in a subsequent error analysis routine.

* * * * *